US008844032B2

(12) United States Patent
Saidi et al.

(10) Patent No.: US 8,844,032 B2
(45) Date of Patent: Sep. 23, 2014

(54) METHOD AND SYSTEM FOR APPLICATION-BASED POLICY MONITORING AND ENFORCEMENT ON A MOBILE DEVICE

(75) Inventors: Hassen Saidi, Menlo Park, CA (US); Rubin Xu, Cambridge (GB)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 13/411,200

(22) Filed: Mar. 2, 2012

(65) Prior Publication Data

US 2013/0232573 A1 Sep. 5, 2013

Related U.S. Application Data

(63) Continuation of application No. 13/411,072, filed on Mar. 2, 2012.

(51) Int. Cl.
*G06F 21/00* (2013.01)
*G06F 21/57* (2013.01)
*G06F 21/62* (2013.01)
*H04L 29/06* (2006.01)

(52) U.S. Cl.
CPC ........ *H04L 63/1416* (2013.01); *H04L 63/1408* (2013.01); *G06F 21/577* (2013.01)
USPC ................. 726/22; 726/23; 726/25

(58) Field of Classification Search
None
See application file for complete search history.

(56) References Cited

U.S. PATENT DOCUMENTS

| | | | |
|---|---|---|---|
| 5,274,810 A * | 12/1993 | Meldrum ...................... 709/202 |
| 5,812,928 A * | 9/1998 | Watson et al. ............... 725/118 |
| 5,845,070 A | 12/1998 | Ikudome |
| 5,925,126 A | 7/1999 | Hsieh |
| 5,974,549 A | 10/1999 | Golan |
| 6,658,471 B1 * | 12/2003 | Berry et al. .................. 709/224 |
| 6,658,571 B1 | 12/2003 | O'Brien et al. |
| 6,665,735 B1 | 12/2003 | Tanaka et al. |
| 6,754,540 B1 | 6/2004 | McFarland et al. |
| 7,181,768 B1 | 2/2007 | Ghosh et al. |
| 7,552,479 B1 | 6/2009 | Conover et al. |
| 7,890,581 B2 * | 2/2011 | Rao et al. ...................... 709/204 |
| 8,051,480 B2 | 11/2011 | Mahaffey |
| 8,060,936 B2 | 11/2011 | Mahaffey et al. |
| 8,087,067 B2 | 12/2011 | Mahaffey et al. |
| 8,099,472 B2 | 1/2012 | Mahaffey et al. |
| 8,108,933 B2 | 1/2012 | Mahaffey |
| 8,201,253 B1 * | 6/2012 | Yan et al. ......................... 726/24 |
| 8,484,732 B1 * | 7/2013 | Chen et al. ...................... 726/22 |
| 2002/0144110 A1 | 10/2002 | Ramanathan |
| 2002/0147967 A1 * | 10/2002 | Frazier .......................... 717/127 |

(Continued)

OTHER PUBLICATIONS

Brewer, Dr. David F.C., et al, "The Chinese Wall Security Policy," Gamma Secure Systems Limited, 1989, 9 pages.

(Continued)

*Primary Examiner* — Andrew Nalven
*Assistant Examiner* — Walter Malinowski
(74) *Attorney, Agent, or Firm* — Barnes & Thornburg LLP

(57) ABSTRACT

A method and system for application-based monitoring and enforcement of security, privacy, performance and/or other policies on a mobile device includes incorporating monitoring and policy enforcement code into a previously un-monitored software application package that is installable on a mobile device, and executing the monitoring and policy enforcement code during normal use of the software application by a user of the mobile device.

31 Claims, 5 Drawing Sheets

(56) References Cited

U.S. PATENT DOCUMENTS

| | | | |
|---|---|---|---|
| 2002/0172363 A1* | 11/2002 | Dierks et al. | 380/259 |
| 2003/0191719 A1 | 10/2003 | Ginter et al. | |
| 2004/0244005 A1* | 12/2004 | Ancier | 718/103 |
| 2004/0255161 A1* | 12/2004 | Cavanaugh | 713/201 |
| 2006/0120526 A1* | 6/2006 | Boucher et al. | 726/29 |
| 2006/0143707 A1* | 6/2006 | Song et al. | 726/22 |
| 2006/0242118 A1* | 10/2006 | Engel | 707/3 |
| 2007/0226797 A1 | 9/2007 | Thompson et al. | |
| 2008/0046965 A1* | 2/2008 | Wright et al. | 726/1 |
| 2008/0115118 A1* | 5/2008 | Bartucca et al. | 717/140 |
| 2008/0235665 A1* | 9/2008 | Sridhar et al. | 717/120 |
| 2008/0247520 A1 | 10/2008 | Scott | |
| 2008/0295146 A1* | 11/2008 | Sriram | 726/1 |
| 2009/0048978 A1* | 2/2009 | Ginter et al. | 705/51 |
| 2009/0049550 A1* | 2/2009 | Shevchenko | 726/23 |
| 2009/0070734 A1 | 3/2009 | Dixon et al. | |
| 2009/0119653 A1* | 5/2009 | Kettley et al. | 717/151 |
| 2009/0187963 A1* | 7/2009 | Bori | 726/1 |
| 2009/0287653 A1* | 11/2009 | Bennett | 726/24 |
| 2010/0125891 A1* | 5/2010 | Baskaran | 726/1 |
| 2010/0281540 A1 | 11/2010 | Alme | |
| 2011/0047594 A1 | 2/2011 | Mahaffey et al. | |
| 2011/0047597 A1 | 2/2011 | Mahaffey et al. | |
| 2011/0047620 A1 | 2/2011 | Mahaffey et al. | |
| 2011/0082900 A1* | 4/2011 | Nagpal et al. | 709/203 |
| 2011/0145920 A1 | 6/2011 | Mahaffey et al. | |
| 2011/0185196 A1* | 7/2011 | Asano et al. | 726/3 |
| 2012/0216242 A1 | 8/2012 | Uner et al. | |
| 2012/0246731 A1* | 9/2012 | Blaisdell et al. | 726/26 |
| 2012/0304310 A1 | 11/2012 | Blaisdell | |
| 2013/0014274 A1* | 1/2013 | Goodes et al. | 726/26 |
| 2013/0073573 A1 | 3/2013 | Huang et al. | |

OTHER PUBLICATIONS

Husted, Nathaniel, et al., "Smartphone Security Limitations: Conflicting Traditions," Dec. 11, 2011, Orland, Florida, 8 pages.
Gehani, Ashish, et al., "SPADE: Support for Provenance Auditing in Distributed Environments," 20 pages.
U.S. Appl. No. 13/659,680 to Phillip A. Porras, filed Oct. 24, 2012, 52 pages.
U.S. Appl. No. 13/411,072 to Hassen Saidi, et al., filed Mar. 2, 2012, 56 pages.
"Android apktool: A tool for reengineering android apk files," available at http://code.google.com/p/android-apktool/, 2 pages.
"Ui/application exerciser monkey," available at developer.android.com/guide/developing/tools/monkey.html, 3 pages.
"Android.os/fakeplayer," available at http://www.f-secure.com/v-descs/trojan_androidos_fakeplayer_a.shtml, 3 pages.
S. International, "Bothunter community threat intelligence feed," available at http://www.bothunter.net, 1 page.
"Frequently Asked Questions," 2011, Nukona Inc., 2 pages, available at https://www.nukona.com/resources/frequently-asked-questions/.
E. Geier, "5 Free Android Security Apps: Keep Your Smartphone Safe," Computerworld, Feb. 21, 2012, 7 pages, available at http://www.computerworld.com/s/article/9224244/5_free_Android_security_apps_Keep_your_smartphone_safe?taxonomyId=145&pageNumber=4.
K. Murphy, "Build Up Your Phone's Defenses Against Hackers," New York Times, Jan. 25, 2012, 2 pages, available at http://www.nytimes.com/2012/01/26/technology/personaltech/protecting-a-cellphone-against-hackers.html.
J.E. Dunn, "Google Chrome Finally Gets Malware Download Protection," PC World, Jan. 7, 2012, 5 pages, available at http://www.pcworld.com/article/247467/google_chrome_finally_gets_malware_download_protection.html.
M. Levinson, "6 Ways to Defend Against Drive-By Downloads," PC World, Feb. 11, 2012, 7 pages, available at http://www.pcworld.com/article/249814/6_ways_to_defend_against_driveby_downloads.html.
"First Half 2011 Threat Report," 2011, 8 pages, Damballa Inc., Atlanta, GA.
D. Kellogg, "In U.S. Market, New Smartphone Buyers Increasingly Embracing Android," Sep. 26, 2011, pp. 1-2, The Nielsen Company, available at http://blog.nielsen.com/nielsenwire/online_mobile/in-u-s-market-new-smartphone-buyers-increasingly-embracing-android/.
"McAfee Threats Report: Second Quarter 2011," 2011, 24 pages, McAfee, available at http://www.mcafee.com/us/resources/reports/rp-quarterly-threat-q2-2011.pdf.
T. Vidas et al., "All Your Droid Are Belong to Us: A Survey of Current Android Attacks," Proceedings of the 5th USENIX Conference on Offensive Technologies, 2011, 10 pages, USENIX Association, Berkeley, CA, USA, available at http://dl.acm.org/citation.cfm?id=2028052.2028062.
L. Davi et al., "Privilege Escalation Attacks on Android," Proceedings of the 13th International Conference on Information Security, 2011, pp. 346-360, Springer-Verlag Berlin, Heidelberg, Germany.
W. Enck et al., "A Study of Android Application Security," Proceedings of the 20th USENIX Conference on Security, 2011, 16 pages, USENIX Association, Berkeley, CA, USA, available at http://dl.acm.org/citation.cfm?id=2028067.2028088.
T. Bläsing et al., "An Android Application Sandbox System for Suspicious Software Detection," 5th International Conference on Malicious and Unwanted Software, 2010, 8 pages, IEEE, Nancy, France.
"Android Reverse Engineering Virtual Machine," Nov. 1, 2011, 1 page, The Honeynet Project, available at http://www.honeynet.org/node/783.
W. Enck et al., "Taintdroid: An Information-Flow Tracking System for Realtime Privacy Monitoring on Smartphones," Proceedings of the 9th USENIX Conference on Operating Systems Design and Implementation, 2010, pp. 1-6, USENIX Association, Berkeley, CA, USA.
P. Hornyack et al., "These Aren't the Droids You're Looking for: Retrofitting Android to Protect Data from Imperious Applications," Proceedings of the 18th ACM Conference on Computer and Communications Security, 2011, pp. 639-652, ACM, New York, NY, USA.
M. Dietz et al., "Quire: Lightweight Provenance for Smart Phone Operating Systems," Proceedings of the 20th USENIX Conference on Security, 2011, 16 pages, USENIX Association, Berkeley, CA, USA.
M. Nauman et al., "Apex: Extending Android Permission Model and Enforcement with User-Defined Runtime Constraints," Proceedings of the 5th ACM Symposium on Information, Computer and Communications Security, 2010, pp. 328-332, ACM, New York, NY, USA.
I. Burguera et al., "Crowdroid: Behavior-Based Malware Detection System for Android," Proceedings of the 1st ACM Workshop on Security and Privacy in Smartphones and Mobile Devices, 2011, pp. 15-26, ACM, New York, NY, USA.
S. Bugiel et al., "Practical and Lightweight Domain Isolation on Android," Proceedings of the 1st ACM Workshop on Security and Privacy in Smartphones and Mobile Devices," 2011, pp. 51-62, ACM, New York, NY, USA.
K. Gudeth et al., "Delivering Secure Applications on Commercial Mobile Devices: The Case for Bare Metal Hypervisors," Proceedings of the 1st ACM Workshop on Security and Privacy in Smartphones and Mobile Devices, 2011, pp. 33-38, ACM, New York, NY, USA.
M. Lange et al., "L4android: A Generic Operating System Framework for Secure Smartphones," Proceedings of the 1st ACM Workshop on Security and Privacy in Smartphones and Mobile Devices, 2011, pp. 39-50, ACM, New York, NY, USA.
J. Andrus et al., "Cells: A Virtual Mobile Smartphone Architecture," Proceedings of the Twenty-Third ACM Symposium on Operating Systems Principles, 2011, pp. 173-187, ACM, New York, NY, USA.
A.P. Felt et al., "A Survey of Mobile Malware in the Wild," Proceedings of the 1st ACM Workshop on Security and Privacy in Smartphones and Mobile Devices, 2011, pp. 3-14, ACM, New York, NY, USA.
W. Enck, "Defending Users Against Smartphone Apps: Techniques and Future Directions," Proceedings of the 7th International Conference on Information Systems Security, 2011, 22 pages, ICISS, Kolkata, India.

(56) References Cited

OTHER PUBLICATIONS

W. Enck et al., "Understanding Android Security," IEEE Security and Privacy, Jan./Feb. 2009, vol. 7, pp. 50-57, IEEE Computer Society, Washington, DC, USA.
E. Chin et al., "Analyzing Inter-Application Communication in Android," Proceedings of the 9th International Conference on Mobile Systems, Applications, and Services, 2011, pp. 239-252, ACM, New York, NY, USA.
W. Enck et al., "On Lightweight Mobile Phone Application Certification," Proceedings of the 16th ACM Conference on Computer and Communications Security, 2009, pp. 235-245, ACM, New York, NY, USA.
"Cyanogenmod: Customized Aftermarket Firmware Distribution for Android," available at http://www.cyanogenmod.com.
B. Barrett, "See Android Market Grow: 9,330 Apps Added Last Month," Gizmodo, Apr. 8, 2010, 3 pages, available at http://gizmodo.com/5512385/see-android-market-grow-9330-apps-added-last-month.
A.P. Felt et al., "Permission Re-Delegation: Attacks and Defenses," Proceedings of the 20th USENIX Conference on Security, 2011, 16 pages, USENIX Association, Berkeley, CA, USA.
M. Degusta, "Android Orphans: Visualizing a Sad History of Support," The Understatement, Oct. 26, 2011, 6 pages, available at http://theunderstatement.com/post/11982112928/android-orphans-visualizing-a-sad-history-of-support.
P. Porras, et al., "An Analysis of the Ikee.B (duh) iPhone Botnet," Dec. 14, 2009, 10 pages, SRI International, available at http://mtc.sri.com/iphone.
I. You & K. Yim, "Malware Obfuscation Techniques: A Brief Survey," Proceedings of the 2010 International Conference on Broadband, Wireless Computing, Communication and Applications, 2010, pp. 297-300, IEEE Computer Society, Washington, DC, USA.
A. Moser et al., "Exploring Multiple Execution Paths for Malware Analysis," Proceedings of the 2007 IEEE Symposium on Security and Privacy, 2007, pp. 231-245, IEEE Computer Society, Washington, DC, USA.
A.P. Felt et al., "Android Permissions Demystified," Proceedings of the 18th ACM Conference on Computer and Communications Security, 2011, pp. 627-638, ACM, New York, NY, USA.
M. Conti et al., "CRePE: Context-Related Policy Enforcement for Android," Proceedings of the 13th International Conference on Information Security, 2011, pp. 331-345, Springer-Verlag Berlin, Heidelberg, Germany.
Y. Nadji et al., "Automated Remote Repair for Mobile Malware," Proceedings of the 2011 Annual Computer Security Applications Conference, 2011, pp. 413-422, ACM, New York, NY, USA.
"Threat Description: Trojan:AndroidOS/Fakeplayer.A," 2009, 3 pages, F-Secure Corporation, available at http://www.f-secure.com/v-descs/trojan_androidos_fakeplayer_a.shtm.
A. Sabapathy, "Latest Android Malware Records Conversations," Aug. 9, 2011, 6 pages, McAfee, available at http://blogs.mcafee.com/mcafee-labs/latest-android-malware-records-conversations.
W.R. Harris et al., "DIFC Programs by Automatic Instrumentation," Proceedings of the 17th ACM Conference on Computer and Communications Security, 2010, pp. 284-296 ACM, New York, NY, USA.
V. Kiriansky et al., "Secure Execution via Program Shepherding," Proceedings of the 11th USENIX Security Symposium, 2002, pp. 191-206, USENIX Association, Berkeley, CA, USA.
42. B. Yee et al., "Native Client: A Sandbox for Portable, Untrusted x86 Native Code," Communications of the ACM, Jan. 2010, vol. 53, pp. 91-99, ACM, New York, NY, USA.
K. Scott et al., "Retargetable and Reconfigurable Software Dynamic Translation," Proceedings of the International Symposium on Code Generation and Optimization: Feedback-Directed and Runtime Optimization, 2003, pp. 36-47, IEEE Computer Society, Washington, DC, USA.
T. Garfinkel et al., "Ostia: A Delegating Architecture for Secure System Call Interposition," Proceedings of the Network and Distributed Systems Security Symposium, Feb. 2004, 15 pages, The Internet Society, Reston, VA, USA.
R.N.M. Watson, "Exploiting Concurrency Vulnerabilities in System Call Wrappers," Proceedings of the First USENIX Workshop on Offensive Technologies, 2007, 8 pages, USENIX Association, Berkeley, CA, USA.
"Openbinder," available at http://www.angryredplanetcom/~hackbod/openbinder/docs/html/, 2005, 3 pages, PalmSource, Inc.
http://gizmodo.com/5512385/see-android-market-grow-9330-apps-added-last-month, 5 pages, Gizmodo.
"The iphoneos/ikee.b worm," available at http://www.f-secure.com/weblog/archives/00001839.html, 2009, 1 page.
"dex2jar: A tool for converting android's .dex format to java's .class format," available at http://code.google.com/p/dex2jar/, 1 page.
"smali: An assembler/disassembler for android's dex format," available at http://code.google.com/p/smali/, 3 pages.
http://www.malkmorgenstern.de/wordpress/?tag=androidnickispy, printed Jun. 4, 2013, 2 pages.
"Nickispy," www.webopedia.com, printed Jun. 4, 2013, 7 pages.
Levine et al., "A Methodology to Characterize Kernel Level Rootkit Exploits that Overwrite the System Call Table", Georgia Institute of Technology, Mar. 2004, 7 pages.

* cited by examiner

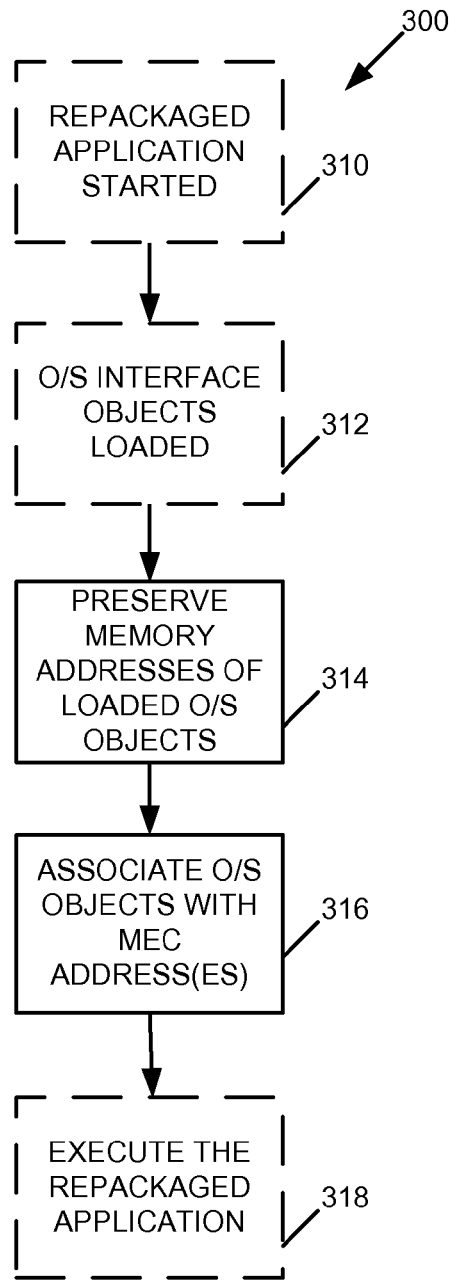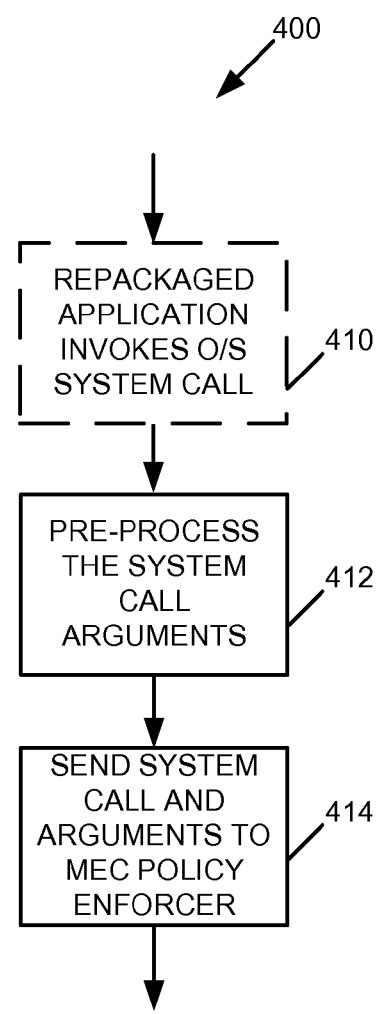
FIG. 3
FIG. 4

METHOD AND SYSTEM FOR APPLICATION-BASED POLICY MONITORING AND ENFORCEMENT ON A MOBILE DEVICE

GOVERNMENT RIGHTS

This invention was made in part with government support under grant number CNS-0716612 awarded by the National Science Foundation and contract number W911NF-06-1-0316 awarded by The United States Army Research Laboratory. The Government has certain rights in this invention.

CROSS-REFERENCE TO RELATED APPLICATION

This application is a continuation of and claims priority to U.S. patent application Ser. No. 13/411,072, filed Mar. 2, 2012, which is incorporated herein by this reference in its entirety.

BACKGROUND

Traditionally, products such as music players, cameras, video recorders, video games, web browsers, Global Positioning System (GPS) locators/navigators, clocks, telephones, and messaging systems were enabled by different electronic devices. More recently, many features of these products have converged onto unitary mobile devices such as smartphones, e-readers, and tablet computers. As a result, software applications exploiting these features have been and continue to be designed for mobile devices. These applications are often capable of storing large amounts of potentially sensitive or private information on a mobile device and communicating with other devices or remote systems over public and/or unsecured networks, with or without the user's knowledge.

The number of software applications that can be downloaded to mobile devices from public "application stores" or "markets" has exploded in recent years. In particular, the amount of downloadable malware masquerading as legitimate applications is on the rise, and new forms of malware seem to appear every day. It can be extremely difficult for users to distinguish "benign" applications from those that have a malicious intent. Even if an application is not intended as malware, it may perform activities that would be considered objectionable by some users. For these and other reasons, mobile devices are increasingly vulnerable to security attacks and/or privacy breaches as a result of application downloads.

SUMMARY

According to at least one aspect of this disclosure, a method includes, with at least one computing device, processing a software application executable by a mobile device to obtain a plurality of components of the software application, and associating at least one second component with at least one of the components of the software application. The at least one second component is configured to, during execution of the software application and without modifying the components of the software application, determine whether the software application is attempting to perform a potentially unauthorized activity. The method also includes creating a software application package comprising the components of the software application and the at least one second component, where the software application package is adapted for installation on the mobile device.

In some embodiments where the mobile device includes at least one computer-accessible medium and an operating system stored in the at least one computer-accessible medium, the method may include installing the at least one second component on the mobile device without modifying the operating system.

The components of the software application may include unsecured compiled components and the at least one second component may include at least one compiled component configured to secure the software application against potentially unauthorized activity. The method may include creating a single executable file based on the components of the software application and the at least one second component without modifying the components of the software application.

The method may include configuring the software application package so that after the software application starts, at least one of the second components executes prior to executing the software application. In some embodiments, where the software application is embodied in a first software application package that includes a manifest file, the method may include updating the manifest file to cause at least one of the second components to execute after the software application is started and prior to execution of the software application. In some embodiments where the software application is embodied in a first software application package and the first software application package includes a first digital certificate, the method may include signing the software application package with a second digital certificate. In some embodiments where the mobile device includes a device-specific security system, the method may include installing the second software application package on the mobile device without modifying the device-specific security system.

The method may include defining at least one policy for determining whether the software application is attempting to perform a potentially unauthorized activity and using the at least one policy to configure at least one of the second components. The method may include receiving input from a user of the mobile device and defining the at least one policy based on the input from the user. The method may include defining at least policy relating to at least one of: application security, application performance, device security, privacy, network security, privilege escalation, a sequence of events, native code, and non-native code.

Also, according to at least one aspect of this disclosure, a method includes, after a software application including code interpretable as a system call to an operating system object is started and loaded into memory for execution by a mobile device, and prior to execution of the software application by the mobile device, at least temporarily associating the operating system object with a security and/or privacy monitoring routine, such that during execution of the software application, the security and/or privacy monitoring routine is executed prior to execution of the at least one system call.

The method may include determining a memory address of the operating system object, and at least temporarily associating the operating system object with a memory address of the security and/or privacy monitoring routine. In embodiments where the mobile device includes a device-specific security system, the method may include associating the operating system object with a memory address of the security and/or privacy monitoring routine independently of the device-specific security system. The method may include using dynamic linking to associate, at least temporarily, the operating system object with a memory address of a security and/or privacy monitoring routine.

Further, according to at least one aspect of this disclosure, a method includes detecting, during execution of a software application by a mobile device on which an operating system is running, by a non-operating system software routine interfacing with the software application, and without modifying the operating system, the software application initiating a system call to the operating system. The method also includes, prior to execution of the system call by the operating system: determining, by the non-operating system software routine interfacing with the software application, based on the system call, whether the software application is attempting to perform a potentially unauthorized activity; and determining, by the non-operating system software routine interfacing with the software application, whether to execute the system call in response to determining whether the software application is attempting to perform a potentially unauthorized activity.

In embodiments where the mobile device operating system includes a device-specific security system, the method may include determining whether the software application is attempting to perform a potentially unauthorized activity independently of the device-specific security system. The method may include determining whether the software application is attempting to perform a potentially unauthorized activity based on at least one security and/or privacy policy. The at least one security and/or privacy policy may be associated with at least one of the system call, the software application, and a user of the mobile device.

The method may include analyzing at least one argument associated with the system call and determining whether the software application is attempting to perform a potentially unauthorized activity based on the at least one argument. Where the system call may be associated with an inter-process communication, the method may include processing the at least one argument of the system call to determine at least one parameter associated with the inter-process communication, and determining whether the software application is attempting to perform a potentially unauthorized activity based on at least one of the parameters associated with the inter-process communication.

The method may include determining whether an argument of the system call is associated with an application that is known or suspected to be malicious by referring to a remote service. The method may include determining whether the system call comprises one of connect( ) ioctl( ) fork( ) execvp( ) and dlopen( ). The method may include associating the system call with at least one policy for blocking the execution of system calls and determining whether to execute the system call based on the at least one policy. The method may include determining whether the system call is configured to initiate one or more of loading native code, establishing a communication connection to a remote device, sending a message, executing a computer program, requesting an input or output, creating a child process, and linking of a library.

The method may include receiving input relating to the system call from a user of the mobile device prior to executing the system call and determining whether to execute the system call, continue executing the software application without executing the system call, or discontinue execution of the software application, in response to the input from the user of the mobile device. The method may include not executing the system call in response to the input from the user of the mobile device. The method may include storing the input from the user, detecting the software application initiating a second system call to the operating system, accessing the stored input in response to detecting the second system call, and determining whether to execute the second system call based on the stored input.

The method may include displaying a message relating to the system call at the mobile device during execution of the software application. The method may include displaying, at the mobile device, an indicator representing a degree of maliciousness of the system call.

Additionally, according to at least one aspect of this disclosure, an electronic device includes at least one processor, at least one memory device coupled to the at least one processor, the at least one memory device having stored therein a plurality of instructions that when executed by the at least one processor, cause the at least one processor to process a first application package including a software application executable by a second electronic device to obtain at least one compiled component of the software application and associate at least one security and/or privacy monitoring routine with the at least one compiled component of the software application. The at least one security and/or privacy monitoring routine is configured to, during execution of the software application by the second electronic device and without modifying the at least one compiled component of the software application, determine whether the software application is attempting to perform a potentially unauthorized activity. The electronic device is also configured to create a second application package comprising the software application and the at least one security and/or privacy monitoring routine, where the second application package is adapted for installation by the second electronic device.

The electronic device may include a network interface adapted to initiate sending of the second software application package to the second electronic device over a network configured to facilitate electronic communications between electronic devices. The electronic device may be configured to receive the first application package from the second electronic device via the network interface.

Further, according to at least one aspect of this disclosure, at least one computer accessible medium includes a plurality of instructions that in response to being executed, result in a mobile computing device, in response to a request to download an application package including at least one executable software application to the mobile computing device: initiating the creation of a new application package comprising the at least one software application and at least one security and/or privacy monitoring routine. The at least one security and/or privacy monitoring routine is configured to, during execution of the software application, determine whether the software application is attempting to perform a potentially unauthorized activity. The instructions may include initiating the installation of the new application package on the mobile computing device. The instructions may include initiating creation of the new application package at a second computing device communicatively coupled to the mobile computing device by a network and initiating downloading of the new application package to the mobile computing device.

BRIEF DESCRIPTION OF THE DRAWINGS

Aspects of this disclosure are illustrated by way of example and not by way of limitation in the accompanying figures. The figures may, alone or in combination, illustrate one or more embodiments of various aspects of this disclosure. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

FIG. 3 is a simplified flow diagram of at least one embodiment of a method for at least temporarily redirecting application flow to security and privacy monitoring and enforcement code;

FIG. 4 is a simplified flow diagram of at least one embodiment of a method for intercepting a system call;

DETAILED DESCRIPTION OF THE DRAWINGS

Figure 1:
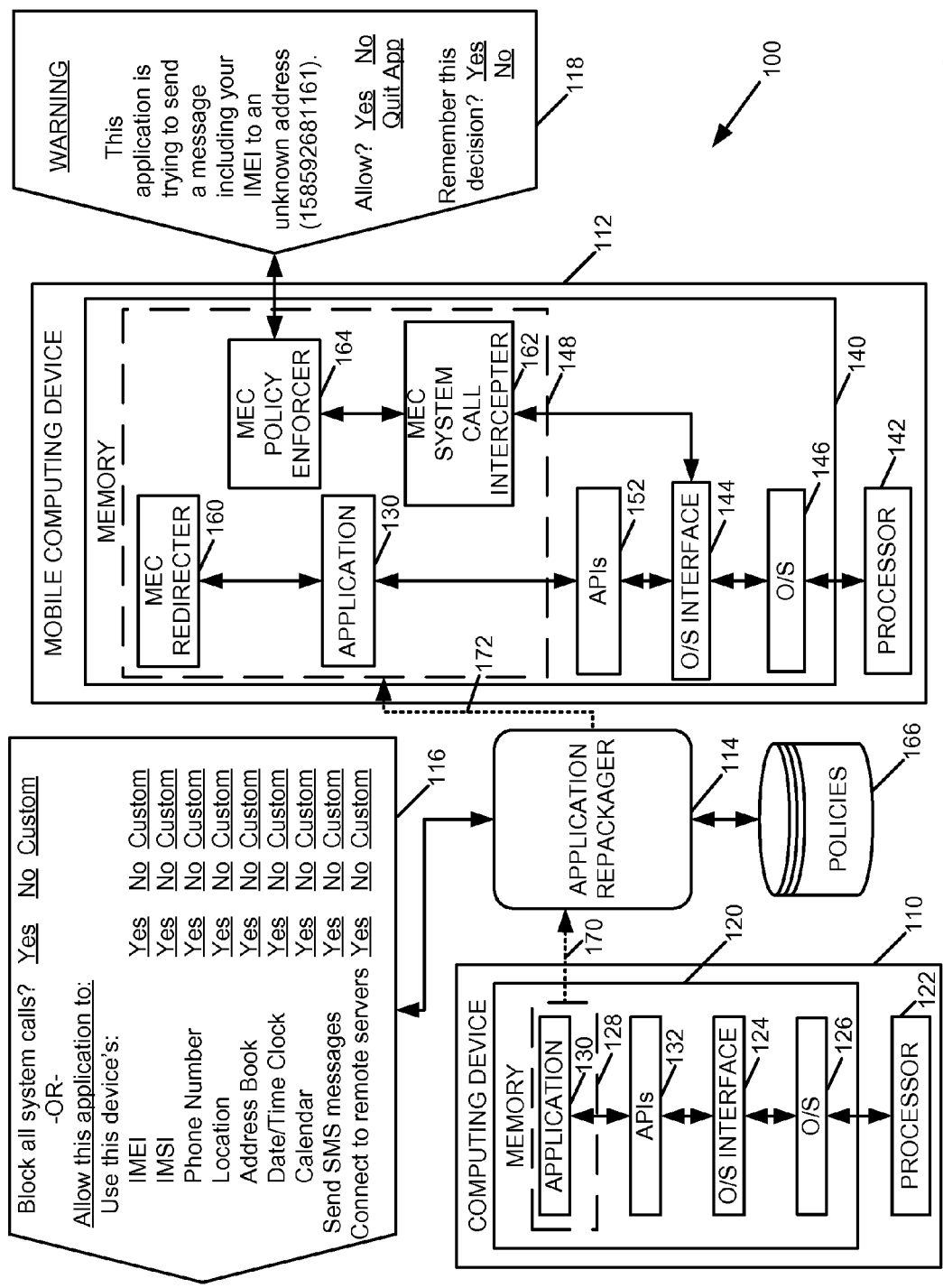
FIG. 1 is a simplified block diagram of at least one embodiment of an application-based security and/or privacy monitoring and enforcement system.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details are set forth in order to provide a more thorough understanding of the present disclosure. It will be appreciated, however, by one skilled in the art that embodiments of the disclosure may be practiced without such specific details. In some instances, details such as control structures and full software instruction sequences have not been shown in order not to obscure the invention. Those of ordinary skill in the art, with the included descriptions, will be able to implement appropriate functionality without undue experimentation.

References in the specification to "one embodiment," "an embodiment," "an illustrative embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions carried by or stored on a transitory or non-transitory machine-readable medium, which may be read and executed by one or more processors. A machine-readable medium may be embodied as any device, mechanism or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C, C++, a combination of any of these, and/or other programming languages.

Similarly, schematic elements used to represent data or information may be implemented using any suitable electronic arrangement or structure, such as a database, data store, table, record, array, index, hash, map, tree, list, graph, file (of any file type), folder, directory or other grouping of files, header, web page, meta tag, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association exists. In other words, some connections, relationships or associations between elements may not be shown in the drawings so as not to obscure the invention. Also, for ease of illustration, a single connecting element may be used to represent multiple connections, relationships or associations between elements. For example, where a connecting element represents a communication of signals, data or instructions, it should be understood by those skilled in the art that such element may represent one or multiple signal paths, as may be needed, to effect the communication.

Referring now to FIG. 1, a security, privacy, performance and/or other policy monitoring and enforcement system 100 is configured to operate in relation to a software application package 128 that includes at least one machine-executable software application 130, the execution of which may be initiated by an end user. The illustrative security, privacy, performance and/or other policy monitoring and enforcement system 100 includes an application repackager 114 and one or more security, privacy, performance, and/or other policies 166. As explained in more detail below, the application repackager 114 can be initiated by a user of a mobile computing device 112, for example, to apply monitoring code to the software application package 128 in accordance with one or more of the security, privacy, performance, and/or other policies 166, prior to, during, or after download or installation, without making any changes to source code for the software application 130 and without modifying the operating system or other programs that may be running on the mobile computing device 112.

As indicated by the dotted arrows 170, 172, the application repackager 114 creates a new (e.g., "secured, "optimized," or "monitored") software application package 148 based on the software application package 128. In addition to the software application 130, the illustrative application package 148 includes security, privacy, performance, and/or other monitoring and enforcement code ("MEC") 160, 162, 164. As described below, the application repackager 114 converts the application package 128 to one or more component software files of the software application 130, uses the policies 166 to configure the MEC 160, 162, 164, associates the MEC 160, 162, 164 with the software application 130, and creates the new application package 148. Once the application package 148 is downloaded to (or otherwise made available for use by) the mobile computing device 112 (or another electronic device), the MEC 160, 162, 164 monitors the software application 130 as it runs and can at least temporarily prevent the software application 130 from engaging in potentially unauthorized activities without the user's permission, or from engaging in potentially unoptimized program flow and/or other activities that may be desirable to be monitored, depending on the particular requirements and/or features of the software application 130 and/or other factors.

The illustrative application package 128 may be embodied as a self-contained application "package," which includes one or more software components, such as files, programs, libraries, resources, utilities, and/or other items that may be needed by the software application 130 during execution. For instance, in embodiments where the software application 130 may be configured for use by an ANDROID or similar device, the software application 130 may include Activity, Service, Content Provider, and/or Broadcast Receiver software components. In some embodiments, the application package 128 may include a number of software component files that are "zipped" or otherwise grouped together and/or compressed. For example, in some embodiments, the application package 128 may include a combination of compiled and uncompiled software components. In embodiments where the software application 130 may be configured for use by an ANDROID or similar device, the application package 128 may include one or more JAVA bytecode files, which may be converted into a single executable file (e.g., a "classes.dex" file); one or more compiled application resources, which may include an application "manifest" file (e.g., "AndroidManifest.xml") or similar file; one or more resource files (e.g., "resources.arsc"), a digital certificate (e.g., "cert.rsa"), and/or one or more other, uncompiled files (e.g., native code libraries and/ or routines implemented using a "lower-level" programming language, such as C or C++).

In some embodiments, downloading and/or installation of the application package 128 may be initiated by a user. For example, in some embodiments, the application package 128 may be downloaded from, e.g., the computing device 110, to the mobile computing device 112, and/or installed on the mobile computing device 112, prior to, during or after operation of the application repackager 114. Downloading and/or installation may be accomplished by a user selecting, "clicking" or otherwise activating an icon, graphic, or text representative of the application package 128, which may be displayed on a graphical user interface of the mobile computing device 112 (e.g., via a network connection to an "app store" or "market"). Once the application package 128 is downloaded and installed, the software application 130 can be executed on the mobile computing device 112 (e.g., by a user selecting or clicking on an icon, graphic or text displayed on a user interface of the mobile computing device 112).

In FIG. 1, the illustrative application package 128 resides in one or more computer-accessible media (e.g., memory) of the computing device 110. In some embodiments, the computing device 110 is embodied as an electronic device that has computing capabilities, such as a smartphone, e-reader, tablet computer, netbook, portable media player or recorder, smart TV, smart appliance, and/or others, and the application package 128 is configured to install the software application 130 on such a device. In some embodiments, the computing device 110 and the mobile computing device 112 may be the same device. In other embodiments, the computing device 110 may be embodied as a networked computer system or as a laptop, desktop, server, enterprise system, and/or others, on which the application package 128 is stored.

In some embodiments, where the software application 130 may be specially configured to run on a certain type of device, the application package 128 may be stored on the computing device 110 but the software application 130 may not be executable thereby. Such may be the case, for example, in embodiments where the software application 130 may be specially configured to run on a mobile computing device and the computing device 110 is not such a device, but operates as an application store or market that makes software application packages available for downloading to mobile devices.

For ease of discussion, FIG. 1 assumes that the software application 130 can be executed by the computing device 110, and depicts components of the computing device 110 during execution of the software application 130 (e.g., at runtime). In embodiments where the software application 130 is specially configured to run on a certain type of computing device (such as the mobile computing device 112) and the computing device 110 is not such a device, the following discussion applies to execution of the software application 130 on a device for which it has been specially configured.

To initiate execution of the software application 130, a user starts (or "launches") the software application 130 by "clicking" on (or otherwise activating, using, e.g., voice or touch) an icon, graphic, or text label representing the software application 130. After the software application 130 is started, the software application 130, as well as any applicable application programming interfaces (APIs) 132, operating system (O/S) interface objects 124, and the operating system 126, are loaded into at least one memory 120 (with at least the operating system 126 typically having been already loaded into memory prior to the start of the software application 130, e.g., at boot-up of the computing device 110).

At runtime, the software application 130 may interact with one or more of the APIs 132. Generally speaking, the APIs 132 are configured to interact with one or more of the operating system interface objects 124 to execute computer logic and/or operations specified by the software application 130. The operating system interface object(s) 124 interact directly with the operating system 126 to cause at least one processor 122 of the computing device 110 to execute machine-readable instructions (e.g., logic and/or operations) corresponding to one or more features of the software application 130. For the purposes of this disclosure, the features of the software application 130 can be arbitrary and may include digital media players or recorders, cameras, video cameras, games, web browsers, Global Positioning System (GPS) locators/ navigators, clocks, telephones, messaging systems, electronic mail, calendaring systems, social networking systems, e-commerce systems, search engines, content retrieval and/or delivery systems, personal productivity applications, and/or "lifestyle" applications, to name a few, and/or any combination of any of the foregoing and/or others. As described below, the illustrative embodiments of the application repackager 114 and the MEC 160, 162, 164 are configured to operate independently of, or irrespective of, the particular features of the software application 130. Also, in the illustrative embodiments, the application repackager 114 and the MEC 160, 162, 164 are not part of or associated with the operating system 126.

In some embodiments, the operating system 126 may be embodied as an open-source operating system such as LINUX. In other embodiments, the operating system 126 may be embodied as a proprietary operating system such as MICROSOFT WINDOWS or APPLE IOS. In some embodiments, the software application 130 may be embodied as higher-level programming code (using, for example, a device-independent programming language such as JAVA, which may be compiled to bytecode or other executable form) or a combination of higher-level programming code and lower-level (e.g. "native") programming code (using, for example, a processor- or operating system-specific version of a programming language such as C or C++). In some embodiments, the APIs 132 may include both higher-level (e.g. JAVA) API libraries and/or objects and lower-level (e.g., C or C++) API libraries and/or objects. In some embodiments, the operating system interface objects 124 may include one or more operating system-specific libraries and/or objects, for example, a "C" library such as "libc" or WINDOWS API. The operating system interface objects 124 can be accessed during execution of the software application 130 using a low-level programming mechanism known as a system call. Additional aspects of the computing device 110, including exemplary embodiments of the memory 120 and the processor 122, are described below with reference to FIG. 6.

Figure 6:
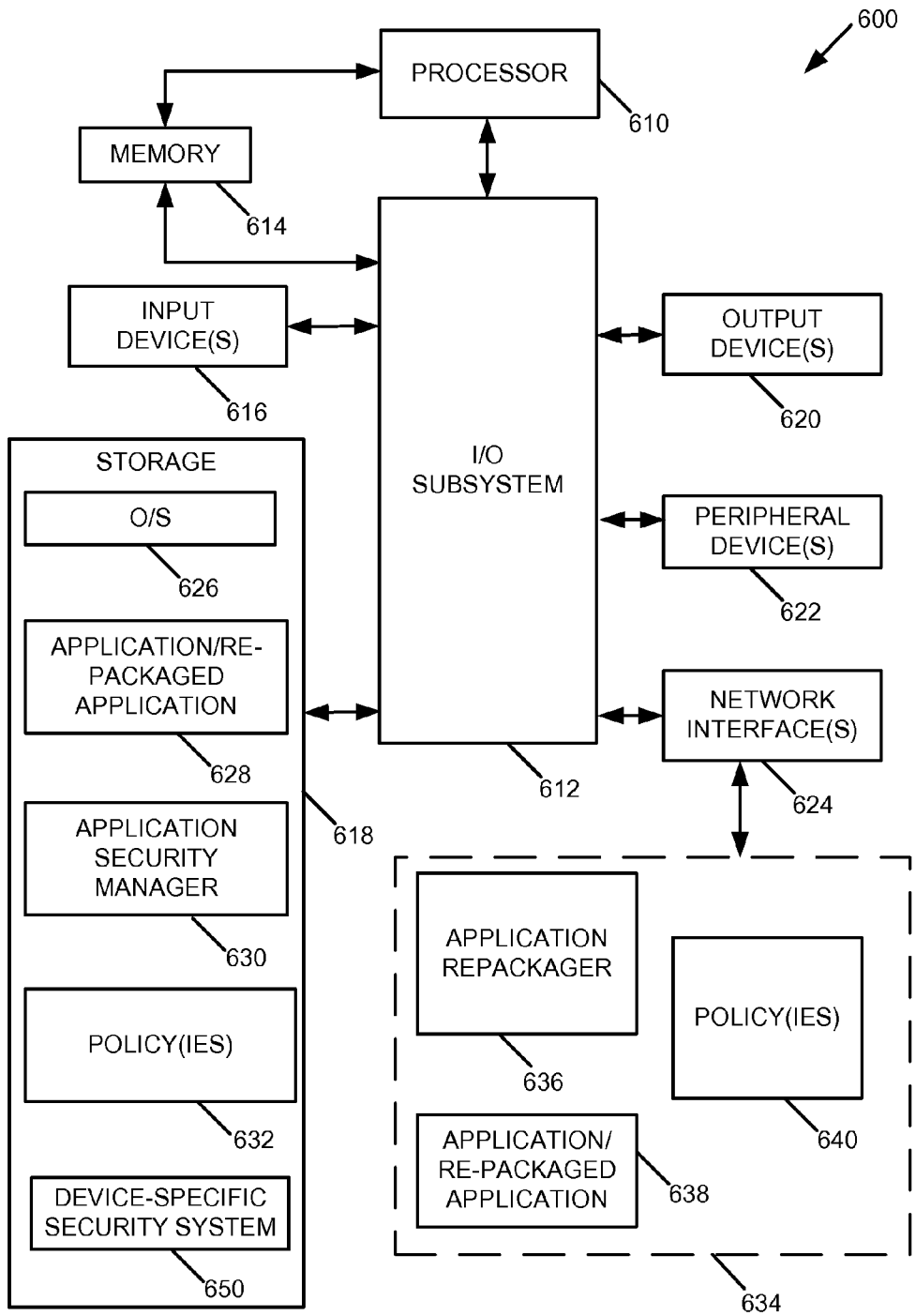
FIG. 6 is a simplified block diagram of at least one embodiment of a computing environment in connection with which aspects of the system of FIG. 1 may be implemented.

The illustrative application repackager 114 is embodied as one or more computer-executable instructions, routines, programs, or processes. The application repackager 114 may in one or more computer-accessible media (e.g., memory) on one or more of the computing devices 110, 112, or on one or more other computing device(s) that may be coupled to one or more of the computing device(s) 110, 112, e.g., via a communications network as shown in FIG. 6. The application repackager 114 configures the security, privacy, performance, and/or other monitoring and enforcement code, which includes, illustratively, a MEC redirecter 160, a MEC system call intercepter 162, and a MEC policy enforcer 164, and associates the MEC 160, 162, 164 with the software application 130. During this process, the illustrative application repackager 114 accesses the policies 166 and configures the MEC 160, 162, 164 based on one or more of the policies 166.

The policies 166 may be embodied as one or more databases, data files, look-up tables, or other suitable data structure(s). The policies 166 may reside in one or more computer-accessible storage media (e.g., memory) on one or more of the computing devices 110, 112, or on one or more other computing device(s) that may be coupled to one or more of the computing device(s) 110, 112, e.g., via a communications network as shown in FIG. 6. As described below, the policies 166 include information relating to security, privacy, performance, and/or other parameters that may be used by the application repackager 114 to configure the MEC 160, 162, 164 so that, during execution of the software application 130, the MEC 160, 162, 164 executes policy logic to determine whether the software application 130 is attempting to engage in a potentially unauthorized activity, unoptimized execution, and/or other activity that may be monitored. Some or all of the policies 166 may be pre-defined or pre-configured (e.g., as "default" policies), or may be automatically configured, based on, for example, one or more aspects of the computing device 110, 112, the software application 130, and/or other factors.

The illustrative application repackager 114 includes a user interface (e.g., the exemplary user interface 116), which allows the user to create and/or customize one or more of the policies 166 to be used in connection with the securing, optimizing, or other monitoring of the software application 130. Any or all of the policies 166 may be specified for a particular software application 130 or may be applicable to one or more other software applications, alternatively or in addition.

Referring to the illustrative user interface 116, the user can specify whether the software application 130 is permitted to engage in certain specific activities, with or without the user's permission, or whether any or all system calls (described below) initiated by the software application 130 should be permitted or blocked. For example, if the user selects "Yes" for any of the configurable activities, the software application 130 may perform the activity without informing the user or prompting the user for permission. If the user selects "No" for any of the configurable activities, the MEC 160, 162, 164 may cause the software application 130 to quit if the software application 130 attempts to perform the activity. If the user selects "Custom," then the user may further "fine tune" the permission setting, e.g., by identifying only certain instances in which the software application 130 is or is not permitted to engage in the activity, by specifying that the user is to be prompted before the software application 130 proceeds with the activity, by indicating that the software application 130 may continue executing without performing the activity (rather than quitting altogether), or otherwise. It should be appreciated by those skilled in the art that the list of activities shown in the illustrative user interface 116 is not intended to be an exhaustive list and that other activities may similarly be configured, alone or in combination with others.

For example, one or more policies 166 may be defined (e.g., by a user or an automated process) to prevent the software application 130 from accessing certain types of data and/or to prohibit the software application 130 from executing certain commands without the user's permission. This includes not only attempts by the software application 130 to access sensitive information that may be stored on the computing device 110, 112 and communicating sensitive information to unauthorized recipients, but also attempts by the software application 130 to escalate privilege or gain root access on the computing device 110, 112 (e.g., by running suspicious system calls and/or loading native libraries).

Some examples of privacy policies that may be implemented using the policies database 166 include policies to protect sensitive or private data of the user, which may include the International Mobile Equipment Identity (IMEI), the International Mobile Subscriber Identity (IMSI), phone number(s) associated with or stored on the computing device 110, 112 and/or other devices, geographic location information and/or associations of location information with other information (obtained by, e.g., a GPS application stored on the computing device 110, 112 and/or other devices), date and/or time information (and/or associations of date/time information with other information), stored SMS messages, status updates, e-mail messages, voice messages and/or other messages, calendar entries, task list entries, contact list or address book entries, phone conversations, photographs, videos, and/or others.

Some examples of security policies that may be implemented using the policies database 166 include policies to prevent the software application 130 from sending SMS messages or other types of messages, from activating the device's camera (e.g., photo or video), voice recorder, Internet browser, and/or other peripheral devices or applications. Some examples of network policies that may be implemented using the policies database 166 include policies to regulate how the software application 130 is permitted to interact with one or more communication networks to which it may connect or be connected (e.g., wired or wireless Ethernet (WIFI), cellular, and/or other networks). For example, network policies can be defined to restrict the software application 130's Internet access to only a particular web domain or set of IP addresses and/or restrict the software application 130's ability to connect to one or more remote Internet Protocol (IP) addresses that are known or suspected to be malicious. In some embodiments, this may be done by consulting an IP address registry or "blacklist" (using, e.g., a utility such as BOTHUNTER), during repackaging by the application repackager 114 and/or at runtime (e.g., by the MEC policy enforcer 164). In some embodiments, one or more network policies may be set to indicate to the user a relative degree of maliciousness of a suspect IP address and/or prompt the user for input as to whether to proceed with the remote connection based on the degree of maliciousness. In some embodiments, this may be done by, for example, color coding the warning messages, using audible and/or other visual cues or signals, and/or other suitable techniques.

In some embodiments, one or more privilege escalation policies may be defined in the policies 166 to warn the user when the software application 130 is attempting to invoke a suspicious system call or sequence of system calls that appears to be suspicious. For example, a privilege escalation policy may require the user to be notified before the software application is permitted to execute a "su" (super user) command or similar command to gain greater control over the computing device 110, 112, or may prevent such attempts altogether. Similarly, one or more policies may be defined to prevent the software application 130 from loading a native code library, executing native code without the user's permission.

Further, the present invention is not necessarily limited to security and privacy applications. In some embodiments, the MEC 160, 162, 164 and/or the one or more of the policies 166 may be configured to monitor execution of the software application 130 with respect to one or more other concerns, such as performance. For example, in some embodiments, the MEC 160, 162, 164 may be configured to intercept system calls that are commonly associated with certain scarce computing resources (e.g., bandwidth or power consumption) and deny execution of the intercepted system calls if it is determined pursuant to an applicable policy that the system calls should not be permitted to execute (e.g., if too many of a certain system call or type or group of system calls are being made by the software application 130). It will be appreciated by those skilled in the art that many other policies and/or combination of policies, including any combination of any of the foregoing and/or others, may be implemented as policies 166 in a similar fashion.

Once the policies 166 are defined for the software application 130, the application repackager 114 configures the MEC 160, 162, 164 to implement the policies 166 in the repackaged application 148. For example, the MEC 160, 162, 164 may include computer logic configured to allow certain activities (e.g., certain system calls, input/output (I/O) requests, interprocess communication (IPC) requests, requests to connect to remote servers, and/or others) to proceed while disallowing others, based on the type of system call and/or one of its arguments, for example. As explained further below with reference to FIG. 5, the policies 166 are enforced by the MEC policy enforcer 164 during execution of the repackaged software application 130.

The application repackager 114 may be embodied as a stand-alone software application, or may be embedded in or accessed by one or more other applications. For example, all or portions of the application repackager 114 may be incorporated into other computing systems or software applications that provide security, privacy, performance, and/or other monitoring or enforcement or that process software applications. Such applications or systems may include, for example, tools for creating user-executable application packages, application downloading services (such as application markets or "app stores"), anti-virus software packages, performance monitoring tools, application testing tools, code analysis tools, security, privacy, authentication, accreditation, and/or certification services (e.g., Verisign, Better Business Bureau (BBB), etc.).

All or portions of the application repackager 114 may be local to a particular computing device 110, 112 or may be distributed across multiple computing devices 110, 112. For example, in some embodiments, application repackager 114 may be installed on a mobile device (e.g., mobile device 112) and executed directly by an end user to "secure" an application installed on the device or an application that is about to be downloaded to or installed on the device. In other embodiments, the application repackager 114 may reside in one or more computer-accessible media (e.g., memory) on one or more remote servers (e.g. one or more physical or logical servers or storage devices accessible by multiple users), an Internet site (e.g. a server hosting a web page or web-based application), and/or other suitable locations depending on the type and/or configuration of the particular embodiment. For example, the application repackager 114 may be offered as a service by a third-party provider. In some embodiments, a user interface portion of the application repackager 114 may reside in one or more computer-accessible media (e.g., memory) on a local device (e.g., the mobile computing device 112) while the remainder of the application repackager 114 resides on one or more remote computing devices. Additional details relating to the application repackager 114 are described below in connection with FIG. 2.

Referring now to the mobile computing device 112, FIG. 1 depicts components of the illustrative mobile computing device 112 during execution of the software application 130 (e.g., at runtime) on the mobile computing device 112 after the software application 130 has been repackaged by the application repackager 114. The same reference numeral is used to refer to the software application 130 both prior to and after repackaging in order to show that, in the illustrative embodiments, the software application itself is not modified by the repackaging process. As noted above, the illustrative application package 148 created by the application repackager 114 includes the software application 130, the MEC redirecter 160, the MEC system call intercepter 162, and the MEC policy enforcer 164.

In some embodiments, the mobile computing device 112 may be any type of electronic device having the aforementioned computing capabilities. As mentioned above, in some embodiments, the mobile computing device 112 may be the same device as the computing device 110; and/or the APIs 152, O/S interface objects 144, operating system 146, one or more memory 140, and one or more processors 142 may be the same or similar to the APIs 132, O/S interface objects 124, operating system 126, memory 120, and processor 122, respectively, described above.

For discussion purposes, an illustrative embodiment in which the mobile computing device 112 is embodied as an ANDROID device (e.g., a device running the GOOGLE ANDROID operating system or similar open-source mobile operating system) will now be described. In the illustrative embodiment, the operating system 146 includes a LINUX kernel (e.g., LINUX 2.6), which interfaces with the one or more processors 142 to enable software applications such as the software application 130 to run on the mobile computing device 112. To do this, the illustrative operating system 146 includes one or more device drivers that can allow software applications installed on the mobile device 112 to, for example, interface with one or more peripheral devices (such as a camera, music player, voice recorder, display, keypad, and/or others), to access memory or network interfaces, and/ or communicate with other processes. In the architecture of the illustrative operating system 146, the APIs 152 include a number of higher-level (e.g., JAVA) APIs and lower-level (e.g., C++) APIs, some or all of which may be referred to as an "application framework." The operating system 146 provides a native code interface (e.g., JAVA NATIVE INTERFACE), which enables software applications that are written in JAVA to utilize the lower-level APIs. Thus, software applications configured for the mobile device 112 (including the software application 130) can be written using a combination of higher-level (e.g., JAVA) and lower-level (e.g., C or C++) programming code. In addition, due to its "open" architecture, the illustrative operating system 146 provides a variety of different APIs 152, including a number of APIs 152 that can be used by an application to accomplish the same end result in different ways.

The illustrative operating system 146 also provides a number of O/S interface objects or libraries 144, which include one or more functions that can be invoked by a system call made by an application or by an API 152 to interface directly with the operating system 146 (e.g., with the LINUX kernel). The illustrative O/S interface objects 144 include an ANDROID-specific version of the standard C library, which may be referred to as the "Bionic libc." No matter which API 152 an application developer decides to use, the operating system 146 is configured so that any API 152 requesting a service of the operating system 146 (e.g., the LINUX kernel) will compile down to or be interpreted as a system call to a native function in the Bionic libc. For example, in some embodiments, if an application wants to download a file from the Internet, it can choose from a number of APIs that may include HttpURLConnection, HttpConnection, Socket, PlainSocketImpl, and/or others, but each of these are ultimately interpreted down to the connect( ) method in the native C library (e.g., Bionic libc or "libc.so"), which issues the system call to the LINUX kernel.

The operating system 146 also provides an application isolation mechanism by which different software applications and system services are isolated from each other at runtime. When a software application (e.g., the software application 130) is started, the operating system 146 allocates a unique "uid" (e.g., a unique application/process identifier) to the application so that it runs in its own process. The operating system 146 assigns memory space to the application, loads the application into its memory space, loads a copy of the applicable APIs 152 and the O/S interface objects 144 into the application's memory space, and dynamically links the APIs 152 and the O/S interface objects 144 with the application. As applications and system services are isolated from each other at runtime (e.g., they each run in their own process), in the illustrative embodiments, a system-level mechanism known as an inter-process communication (IPC) is invoked any time an application wants to communicate with another application or system service. The operating system 146 provides a mechanism (which may be referred to as a "binder") by which IPCs are handled by the LINUX kernel and communicated by the kernel to the intended recipient of the communication. So, for example, if an application wants to send a text message, it can use a high-level API such as SMSManager, but internally, this is converted to an IPC call using the O/S binder and is ultimately interpreted down to the ioctl( ) method in the native C library (e.g., Bionic libc or "libc.so"), which initiates the IPC communication via the LINUX kernel. Examples of functions included in the O/S interface objects 144 in the illustrative embodiments include not only connect( )@ libc.so, ioctl( )(@ libc.so, but also dlopen( ) fork( ) and execvp( )(each, @ libc.so); however, this is intended to be an exemplary, not exhaustive, list.

The illustrative operating system 146 also provides an install-time application permission system (e.g., a device-specific security system 650 as shown in FIG. 6). The install-time permission system provides that, when an application is installed on the mobile device 112, the operating system 146 identifies to the user any security privileges and/or permissions that are requested by the application, and the user either grants or denies the privileges and/or permissions prior to installation of the application. If the user denies the requested privileges and/or permissions, the application cannot be installed. As the application is not installed unless the requested privileges and/or permissions are agreed to, the application repackager 114 and the MEC 160, 162, 164 do not interfere with the device-level install-time permission system. Rather, the application repackager 114 and the MEC 160, 162, 164 allow the user to accept the privileges and/or permissions requested by the application at install time, and then enable the user to supplement or "fine tune" those privileges and/or permissions during repackaging of the application, via the policies 166.

This is illustrated by the exemplary user interface 118, which may appear at runtime if the MEC system call intercepter 162 encounters a suspicious system call (such as, in the illustrative example, a system call that is trying to send the user's IMEI to an unknown recipient). That is, the fact that the repackaged application 130 is installed on the mobile computing device 112 (with the MEC 160, 162, 164 associated therewith) indicates that the user has agreed to the security privileges and/or permissions requested by the software application 130 at install time via the operating system 146's application permission system (e.g., the device-specific security system 650). Then, as explained further below, at runtime of the repackaged application 130, the MEC redirecter 160 causes system calls (e.g., calls to functions in the Bionic libc or libc.so) to be redirected to the MEC system call intercepter 162, without modifying the software application 130 or the operating system 146. The MEC system call intercepter 162 pre-processes the redirected system call and its arguments, and passes that information on to the MEC policy enforcer 164. The MEC policy enforcer 164 (having been configured according to the policies 166 by the application repackager 114) determines whether to execute the system call. In some embodiments, as shown by the exemplary user interface 118, the MEC policy enforcer 164 prompts the user for input relating to the intercepted system call and determines whether to execute the system call based on the user's input. Also, in some embodiments, the MEC policy enforcer 164 may store the user's input (e.g., in cache memory) for future use (if the software application 130 attempts to invoke the same system call again, for example).

Figure 2:
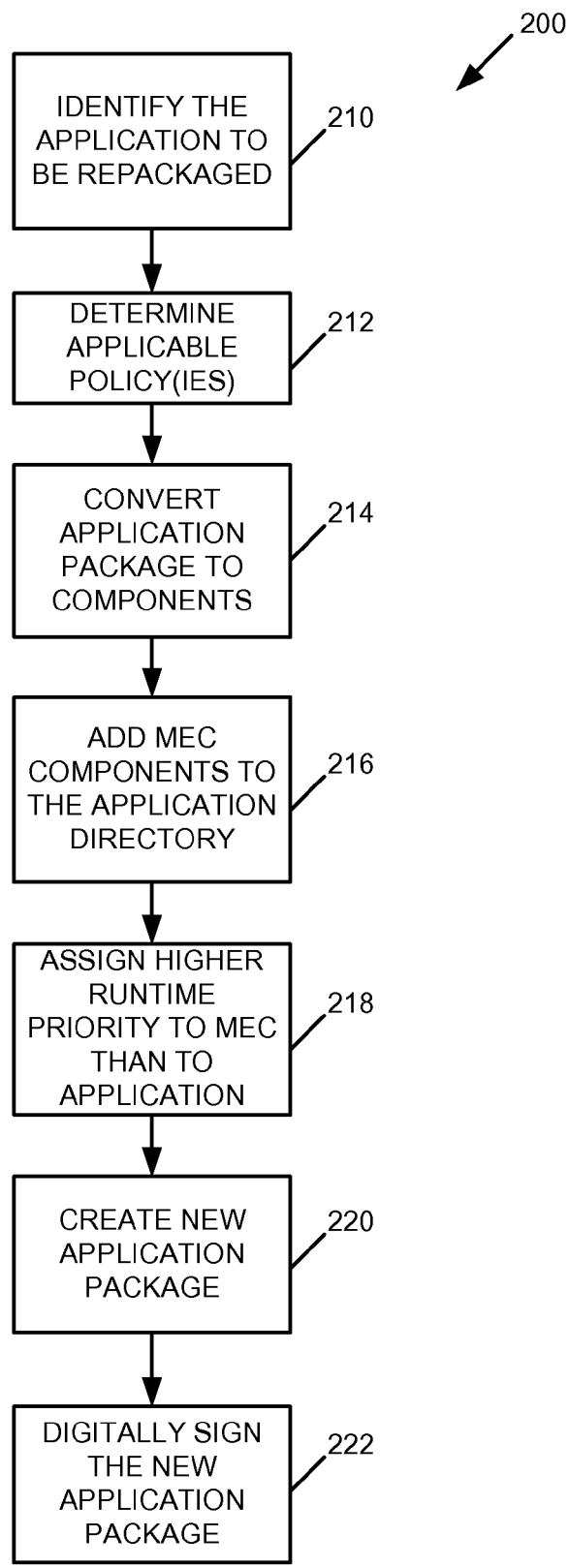
FIG. 2 is a simplified flow diagram of at least one embodiment of a method for creating an application package including an application and security and privacy monitoring and enforcement code.

Referring now to FIG. 2, an illustrative method 200, which may be implemented as one or more computer-executable instructions, routines, or processes by which the application repackager 114 may add privacy and security monitoring and enforcement code (e.g., MEC 160, 162, 164) to an application package, is shown. At block 210, the method 200 identifies the software application to be repackaged. To do this, in some embodiments, the method 200 may process and/or interpret one or more arguments or inputs received by the application repackager 114, which may include the application name, location (e.g., directory or folder), and/or other information identifying the application to be repackaged. In the illustrative embodiments, the application to be repackaged is the "unsecured" version of the software application 130 contained in the application package 128.

At block 212, the method 200 determines which of the policies 166 are applicable to the application to be repackaged (e.g., the software application 130 contained in the application package 128). This may be done, in some embodiments, based on the type of computing device on which the software application 130 is intended to be installed, the type of software application, user-specified preferences, and/or other criteria. For example, in some embodiments, computer game applications may have different policies than information-retrieval applications. Also, in some embodiments, the policies 166 may be stored "in the cloud" (e.g., on one or more remote servers), and at least some of the policies 166 may be applicable to certain types of devices but not others. As an illustration, a user may own multiple types of computing devices (e.g., a smartphone, a tablet, and a media player, or two different brands of smartphones), and may specify some policies that are applicable to one or more of those devices but not to the others. The information linking the policies 166 and the applicable applications and/or devices may be stored with the policies 166, or in a look-up or mapping table, or other suitable data structure, which may be accessed by the method 200 at block 212.

At block 214, the method 200 processes the original application package 128; which includes the software application 130 identified at block 210, to convert or disassemble it into its constituent components. Using the ANDROID example, the application package 128 may be embodied as a single archive file called an ANDROID APPLICATION PACKAGE or APK file. The APK file includes a compiled manifest file (e.g., AndroidManifest.xml), the compiled application code (e.g., a classes.dex file, which contains the application's code in the form of a single dex bytecode file), compiled XML resources such as window layout and string constant tables, uncompiled resources such as image and sound files and native libraries, and a digital signature. The method 200 uses a disassembling tool, such as APKTOOL or SMALI, to disassemble or decode the classes.dex file into a directory tree structure that maps each constituent bytecode file of the application package 128 to a single JAVA class and maps its directory path to the directory hierarchy. All of the other components of the application package 128 are also stored in the same directory structure.

At block 216, the method 200 adds (e.g., by copying or moving) the MEC 160, 162, 164 to the directory created at block 214, which contains the components of the application package 128. At block 218, the method 200 ensures that the MEC 160, 162, 164 will be invoked at runtime ahead of the software application 130 by assigning a higher priority to the MEC 160, 162, 164 than the software application 130. In the ANDROID example, the compiled (e.g. dex bytecode) manifest file for the application package 128 is modified to define at least the MEC redirecter 160 as the "Application class," which will be instantiated by the ANDROID runtime environment when the repackaged software application 130 is started. If there is already an Application class defined in the software application 130's compiled manifest file, then the existing class is maintained but its definition is modified so that it inherits from the Application class defined for the MEC redirecter 160. It should be appreciated that at block 216, modifications are made only to a compiled manifest file, and not to any executable files of the software application 130 or to any source code of the software application 130.

At block 220, the method 200 creates the new application package 148 including the MEC 160, 162, 164 and the updated application priority information. In the ANDROID example, the method 200 uses an assembling tool (e.g., APKTOOL or SMALI) to assemble the disassembled bytecode files back to dex bytecode form and create the new application package 148. The application package 148 includes the updated manifest file and the MEC 160, 162, 164, in the form of a new APK file. It should be appreciated that at block 220, the MEC 160, 162, 164 is added to the application package 148 without modifying the executable files or source code of the software application 130.

At block 222, the new application package 148 is authenticated with a digital signature. In at least the ANDROID example, the method 200 creates a new digital certificate and signs the application package 148 with the new certificate. The signed application package 148, e.g., the "secured" version of the application package 128, is then ready to be installed on a computing device (e.g., the mobile device 112).

Referring now to FIG. 3, an illustrative method 300, which may be implemented as one or more computer-executable instructions, routines, or processes by which the MEC redirecter 160 may cause low-level system calls made by the repackaged software application 130 to be redirected to privacy, security, performance and/or other monitoring and enforcement code at runtime, is shown. Generally speaking, the MEC redirecter 160 operates after the software application 130 is started but before the software application 130 begins executing, to, during execution of the software application 130, cause system calls to functions in the O/S interface objects 144 to be at least temporarily redirected to the MEC system call intercepter 162. Thus, in FIG. 3, the blocks 310, 312, and 318 depicted with dashed lines are not part of the MEC redirecter 160, but are processes that occur before and after the MEC redirecter 160 operates. At block 310, the repackaged software application 130 is started as described above. At block 312, the repackaged software application 130 and the MEC 160, 162, 164 are assigned to a process memory space and loaded into memory, and the APIs 152 and the O/S interface objects 144 are loaded into the process memory space and are dynamically linked to the repackaged software application 130. Typically, these steps are performed by operating system utilities, which may be referred to as a "loader" and a "linker," after the software application 130 is started. In the illustrative embodiments, the dynamic linking creates a mapping table (which may be referred to as a "global offset table" or GOT). The mapping table includes an array of function pointers of all of the dynamically-linked external functions (e.g., functions accessible via the APIs 152 and/or the O/S interface objects 144) that are referenced by the software application 130 during its execution. For example, in some embodiments, the mapping table may include a table or listing of function names or identifiers, names or identifiers of the corresponding objects or libraries in which the functions are located, and the memory addresses assigned to the functions by the loader at runtime.

The MEC redirecter 160 begins executing after the dynamic linking is complete and before the software application 130 begins executing, by virtue of it having been assigned a higher runtime priority than the software application 130 (e.g., by having been declared as the base Application class) by the application repackager 114 at block 218 of FIG. 2. At block 314, the MEC redirecter 160 preserves the memory addresses allocated by the loader at block 312 to the functions in the O/S interface objects 144. In some embodiments, this may be done by simply making a copy of the mapping table and storing it in one or more computer-accessible media (e.g., cache memory).

At block 316, the MEC redirecter 160 associates the system-level functions in the O/S interface objects (e.g., the native C library or libc.so functions) with the memory address(es) assigned to the MEC system call intercepter 162 by the loader at runtime. In the illustrative embodiments, this may be done by replacing the original mapping table or creating a new mapping table and replacing the memory addresses of the O/S interface objects 144 with the memory address(es) of the MEC system call intercepter 162. In effect, the MEC redirecter 160 simply "re-dos" the dynamic linking to cause the O/S interface objects 144 to be associated with the MEC system call intercepter 162. The end result of this is that, during execution of the repackaged software application 130, which begins at block 318, system calls to functions in the O/S interface objects 144 are redirected to the MEC system call intercepter 162 before they are executed. It should be appreciated that in some embodiments, the MEC redirecter 160 and MEC system call intercepter 162 may be configured, e.g., by the application repackager 114 according to the policies 166, so that only certain system calls are intercepted and redirected at runtime, or so that every system call is intercepted and redirected. So as to be able to modify the process memory, the illustrative embodiments of the MEC redirecter 160 are written in a lower-level programming language (such as C++) and compiled to native code.

Referring now to FIG. 4, an illustrative method 400, which may be implemented as one or more computer-executable instructions, routines, or processes by which the MEC system call intercepter 162 may pre-process system call information at runtime, is shown. As a result of the work of the MEC redirecter 160 prior to execution of the repackaged software application 130, the MEC system call intercepter 162 is invoked during execution of the repackaged software application 130 each time the repackaged software application 130 initiates a system call that has been redirected by the MEC redirecter 160. Thus, block 410 is shown with dashed lines to indicate that it is the repackaged software application 130, not the MEC system call intercepter 162, that performs block 410. When the repackaged software application 130 invokes a system call at block 410, the program flow is redirected to the MEC system call intercepter 162 before the system call is executed, as a result of the dynamic linking done earlier by the MEC redirecter 160.

At block 412, the MEC system call intercepter 162 pre-processes the intercepted system call and/or its arguments, to determine the nature or intent of the system call. For example, if the intercepted system call is a call to the connect( ) function in the native C library (e.g., libc.so), the arguments may include a target IP address and port, and/or others. The MEC system call intercepter 162 may parse or otherwise reformat or process the argument(s) to put them into a form that can be fed to and used by the MEC policy enforcer 164. When the MEC system call intercepter 162 encounters a system call that involves an inter-process communication (e.g., a call to the ioctl( ) function in libc.so), the arguments may include the type of IPC requested (e.g., a call to the camera application), and, embedded in the IPC request, the arguments for the call to the camera application (e.g., instructions for the camera application, such as whether to turn the camera on, off, take a picture, etc.). Thus, additional pre-processing may be needed to extract the IPC parameters from the system call arguments and reconstruct them in a form that can be passed to and used by the MEC policy enforcer 164. In the illustrative embodiments, the MEC system call intercepter 162 is written in a lower-level programming language (such as C++) and compiled to native code. The pre-processed system call and arguments are passed (e.g., as parameters) to the MEC policy enforcer 164 at block 414.

Figure 5:
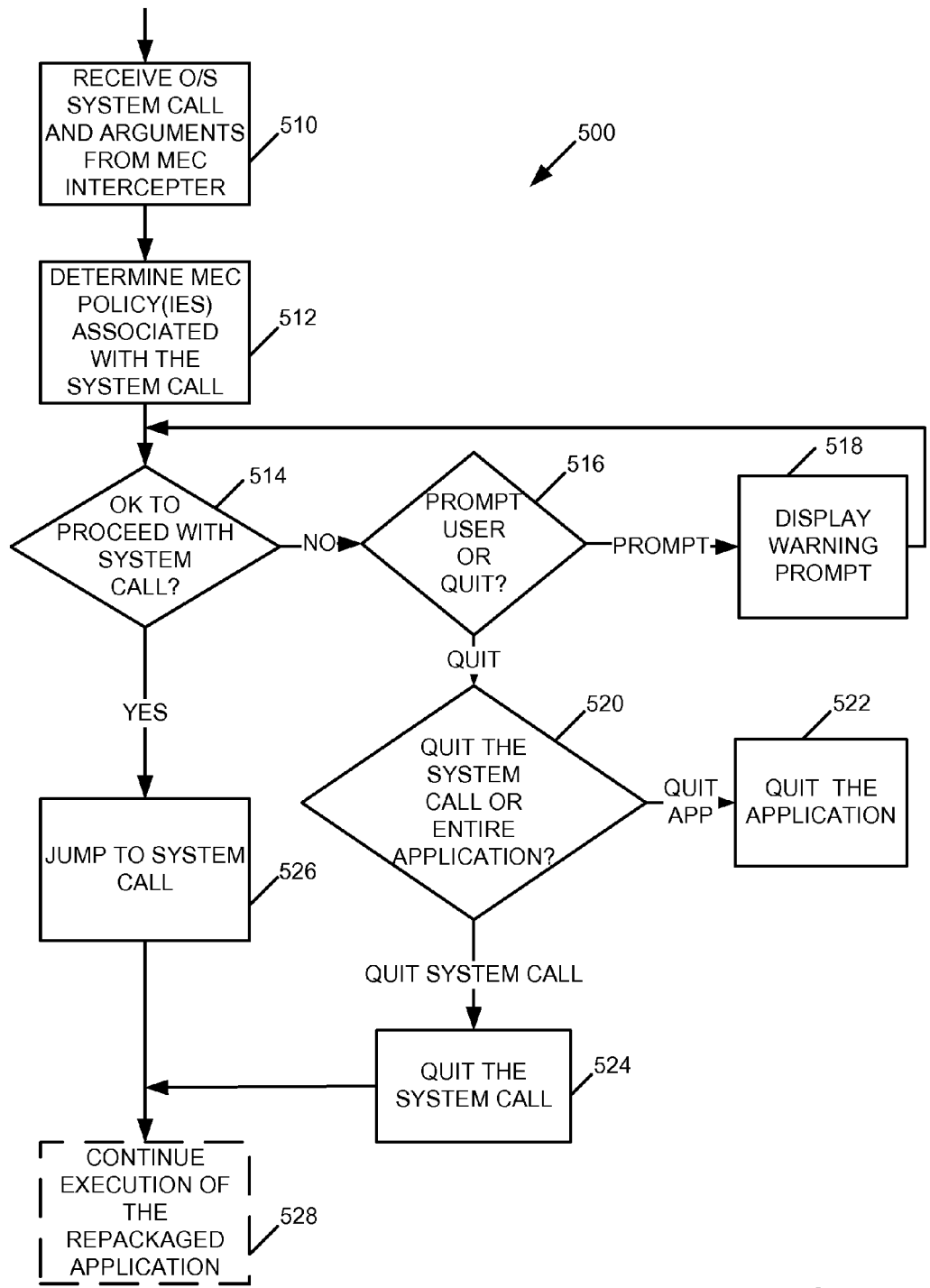
FIG. 5 is a simplified flow diagram of at least one embodiment of a method for enforcing security and/or privacy policies.

Referring now to FIG. 5, an illustrative method 500, which may be implemented as one or more computer-executable instructions, routines, or processes by which the MEC policy enforcer 164 may enforce application-based privacy, security, performance and/or other policies during execution of the repackaged software application 130, is shown. In the illustrative embodiments, the MEC policy enforcer 164 is invoked by the MEC system call intercepter 162. At block 510, the method 500 receives the intercepted system call and its arguments from the MEC system call intercepter 162 (e.g., as parameters).

At block 512, the method 500 analyzes the intercepted system call and argument information and determines which policy logic applies to the system call and/or arguments. For example, in some embodiments, a user may have defined (e.g., during the repackaging done by the application repackager 114) a policy that connect( ) system calls can be permitted for certain target IP addresses, but not for others; or, that for this particular application, no connect( ) system calls should be permitted at all. Alternatively or in addition, the policy logic may pass the target IP address information to a domain registry or blacklisting service (e.g., BOTHUNTER) to determine at runtime whether the target IP address is known or suspected to be malicious. As another example, in some embodiments, a user may have defined (e.g., during the repackaging done by the application repackager 114) a policy that ioctl( ) system calls can be permitted for certain target applications, but not for others; or for certain features of the target application but only with the user's consent (for example, to turn on the camera but to prompt the user before taking any pictures). In some embodiments, the MEC policy enforcer 164's policy logic is configured during repackaging by the application repackager 114 in accordance with the policies 166. Thus, in those embodiments, there may not be any need to access the policies database 166 at runtime, but only to execute the policy logic. In other embodiments, the MEC policy enforcer 164 may be configured to access the policies 166 at runtime.

At block 514, the method 500 determines, based on the policy logic, whether to proceed with the intercepted system call without user input. If the method 500 determines that the system call should not be executed without user input, then at block 516 the method 500 determines whether to prompt the user for input as to whether to continue with the system call or to simply quit the system call. If the policy logic indicates that the user should be prompted for input, then at block 518, a warning message and prompt is displayed (e.g., via the user interface 118). After receiving user input at block 518, the method 500 returns to block 514 and either proceeds with the system call based on the user input or skips over or aborts (or otherwise does not execute) the system call.

In some embodiments, as shown by the exemplary user interface 118, the method 500 may ask the user whether to store the user's input for future use. Thus, if at block 518 the user answers "Yes" to proceed with the system call and "Yes" to remember that decision, then the next time the repackaged application 130 attempts to invoke the same system call (and/or other similar or related system calls), the MEC policy enforcer 164 may proceed directly from block 514 to block 526 based on the stored user input.

If, at block 516, the policy logic indicates that the system call should be aborted without user input, then the method 500 proceeds to block 520. At block 520, the method 500 determines based on the policy logic whether to not execute the system call or to quit executing the entire application. If the method 500 determines that the entire application should be ended, then at block 522 execution of the repackaged software application 130 is ended. If the method 500 determines that the system call should not be executed but the execution of the repackaged software application 130 may otherwise continue, then at block 524, the method 500 skips or aborts the system call (or otherwise does not execute the system call) and continues the normal execution of the repackaged software application at block 528.

If, at block 514, the method 500 determines, based on the policy logic and/or user input, that the system call can be executed, then at block 526, the method 500 jumps to the system call and executes the system call as originally invoked by the repackaged software application 130. At block 526, the method 500 may access the preserved original copy of the mapping table created by the MEC redirecter 160 at block 314 of FIG. 3 to determine the actual memory location of the system call. The method 500 returns control to the repackaged software application 130 at blocks 524 and 526, and the repackaged software application 130 continues normal execution at block 528. In the illustrative embodiments, the MEC policy enforcer 164 is written in a higher-level programming language (such as JAVA) and compiled to executable code (e.g., dex bytecode).

Referring now to FIG. 6, an illustrative embodiment of a computing device 600, in connection with which aspects of the security, privacy, performance, and/or other monitoring and enforcement system 100 may be implemented, is shown. For example, either and/or both of the computing devices 110, 112 may be implemented with one or more of the features of the computing device 600. The illustrative computing device 600 includes at least one processor 610 and an input/output (I/O) subsystem 612. The processor 610 includes one or more processor cores (e.g. microprocessors). The I/O subsystem 612 typically includes, among other things, an I/O controller, a memory controller, and one or more I/O ports (not shown). The processor 610 and the I/O subsystem 612 are communicatively coupled to a memory 614. The memory 614 may be embodied as any type of suitable memory device, such as a dynamic random access memory device (DRAM), synchronous dynamic random access memory device (SDRAM), double-data rate dynamic random access memory device (DDR SDRAM), and/or other volatile memory device.

The I/O subsystem 612 is communicatively coupled to at least one input device 616, at least one data storage 618, at least one output device 620, one or more peripheral devices 622 (optional), and at least one network interface 624. The input device 616 may include a keyboard, keypad, touch screen, microphone, or other suitable device for accepting input from a user (e.g., via user interfaces 116, 118). The output device 620 may include a text, graphics, and/or video display screen, speaker, or other suitable device for presenting output (e.g. warning messages and prompts such as shown by user interface 118), to the user. The peripheral device(s) 622 may include, for example, cameras, media players or recorders, GPS devices, graphics, sound and/or video adapters, and/or others, depending upon, for example, the intended use of the computing device 600.

The network interface 624 communicatively couples the computing device 600 to one or more networks 634, which may include a local area network, wide area network, personal cloud, enterprise cloud, public cloud, and/or the Internet. Accordingly, the network interface 624 may include a wired or wireless Ethernet adapter, WIFI adapter or other suitable device as may be needed, pursuant to the specifications and/or design of the particular network 624.

The illustrative data storage 618 includes one or more computer-accessible media, such as one or more hard drives or other suitable data storage devices (e.g., memory cards, memory sticks, and/or others). In the illustrative embodiment, an operating system 626 and a device-specific security system 650 reside in the data storage 618. The operating system 626 is, for example, a MICROSOFT WINDOWS, LINUX, IOS, or other operating system, or other similar set of instructions, which may be designed specifically for a particular type of computing device, for example, a discrete, handheld, or portable electronic device or smartphone. The device-specific security system 650 is, for example, an application permission system such as the ANDROID install-time application permission system described above, or other similar set of code or instructions, which may be designed specifically for a particular type of computing device, for example, a discrete, handheld, or portable electronic device or smartphone.

In the illustrative example, the security, privacy, performance and/or other monitoring and enforcement system 100 includes an application security manager 630, an application repackager 636, and one or more security, privacy, performance, and/or other policy(ies) 632, 640. At least a portion of each of the application security manager 630, and the policy (ies) 632, 640 is stored in the data storage 618. Portions of the operating system 626, application security manager 630, and the policy(ies) 632 may be copied to the memory 614 during operation, for faster processing or for other reasons.

In some embodiments, the application security manager 630 may be embodied as a client application or front-end user interface for the security, privacy, performance, and/or other policy monitoring and enforcement system 100, while a back end or server application (e.g., the application repackager 636) may reside on the network 634. Similarly, the policy(ies) 632, 640 may include some policies that are local to the computing device 600, such as user-, device-, and/or application-specific policies; while other aspects of the policy(ies) 632, 640, which may be user-, device-, and/or application-independent, for example, may reside on the network 634. In other embodiments, the entire security, privacy, performance and/or other monitoring and enforcement system 100 may be stored in the data storage 618 of the computing device 600.

In some embodiments, the application security manager 630 may be launched automatically each time a user of the computing device 600 attempts to, or has already, downloaded an application 628, 638. In other embodiments, the application security manager 630 may be invoked to upload an application to the network 634 to be repackaged by the application repackager 636. The application security manager 630 may invoke the application repackager 636 to create the repackaged application 628, 638 and replace the original application on the computing device 600 and/or the network 634 with the repackaged application 628, 638 as shown in FIG. 6.

The computing device 600 may include other components, sub-components, and devices not illustrated in FIG. 6 for clarity of the description. In general, the components of the computing device 600 are communicatively coupled as shown in FIG. 6, by one or more signal paths, which are represented schematically as bidirectional arrows. Such signal paths may be embodied as any type of wired or wireless signal paths capable of facilitating communication between the respective devices.

While aspects of this disclosure have been illustrated and described in detail in the drawings and in the foregoing description, such illustrations and description are to be considered as exemplary and not restrictive in character, it being understood that only illustrative embodiments have been shown and described and that all changes and modifications that come within the spirit of the disclosure are desired to be protected. Further, while certain aspects of the present disclosure have been described in the context of an exemplary smartphone implementation, it will be understood that the various aspects are applicable to other mobile device configurations (including ANDROID, APPLE IOS and/or others) and have other applications, for example, any application in which it is desired to provide security, privacy, performance, and/or other monitoring at the application level. Such applications may include, for example, application "vetting" services and/or application developer solutions such as performance rating systems, security validation systems, and vulnerability testing systems, as well as application "store" or "market" services and other consumer-oriented services, including trusted application indicators and anti-virus software, for example.

In addition, aspects of this disclosure are applicable to electronic devices other than smartphones, including devices that may not typically be considered "mobile." For example, the computing device 600 may be embodied in or as any type of computing device capable of performing the functions described herein. For example, the computing device 600 may be embodied as a cellular phone, a smartphone, a mobile Internet device, a handheld, laptop or tablet computer, a personal digital assistant, a telephony device, or other portable electronic device. Also, while not typically considered "mobile" in so far as that term may be inferred by some as referring to a handheld device, it should be understood that aspects of this disclosure are applicable to other types of electronic devices, such as desktop computers, servers, enterprise computer systems, networks of computers, Internet-enabled televisions or other electronic appliances, or other electronic device(s) that are capable of performing the functions described herein, depending on the particular implementation of the security, privacy, performance and/or other policy monitoring and enforcement system 100.

The invention claimed is:

1. A method comprising:
   detecting, during execution of a software application by a mobile device on which an operating system is running, as a result of a non-operating system software routine comprising redirecting code interfacing with the software application after a user-initiated launch of the software application and prior to the execution of the software application, the software application initiating a system call to the operating system, the redirecting code enabling the detecting of the initiating of the system call by replacing an address associated with the system call with an address of intercepting code; and
   prior to execution of the system call by the operating system:
   determining, by executing the intercepting code to pass an argument of the system call to application monitoring code, whether the software application is attempting to perform a potentially unauthorized activity; and
   determining, by executing the application monitoring code to evaluate the argument of the system call, whether to execute the system call in response to determining whether the software application is attempting to perform a potentially unauthorized activity.

2. The method of claim 1, wherein the mobile device operating system comprises a device-specific security system, comprising determining whether the software application is attempting to perform a potentially unauthorized activity independently of the device-specific security system.

3. The method of claim 1, comprising determining whether the software application is attempting to perform a potentially unauthorized activity based on at least one security and/or privacy policy.

4. The method of claim 3, wherein at least one security and/or privacy policy is associated with at least one of the system call, the software application, and a user of the mobile device.

5. The method of claim 1, comprising analyzing at least one argument associated with the system call and determining whether the software application is attempting to perform a potentially unauthorized activity based on the at least one argument.

6. The method of claim 5, wherein the system call is associated with an inter-process communication, comprising processing the at least one argument of the system call to determine at least one parameter associated with the inter-process communication, and determining whether the software application is attempting to perform a potentially unauthorized activity based on at least one of the parameters associated with the inter-process communication.

7. The method of claim 5, comprising determining whether an argument of the system call is associated with an application that is known or suspected to be malicious by referring to a remote service.

8. The method of claim 1, comprising associating the system call with at least one policy for blocking the execution of system calls and determining whether to execute the system call based on the at least one policy.

9. The method of claim 1, comprising determining whether the system call is configured to initiate one or more of: loading native code, establishing a communication connection to a remote device, sending a message, executing a computer program, requesting an input or output, creating a child process, and linking of a library.

10. The method of claim 1, comprising receiving input relating to the system call from a user of the mobile device prior to executing the system call and determining whether to execute the system call, continue executing the software application without executing the system call, or discontinue execution of the software application, in response to the input from the user of the mobile device.

11. The method of claim 10, comprising not executing the system call in response to the input from the user of the mobile device.

12. The method of claim 10, comprising storing the input from the user, detecting the software application initiating a second system call to the operating system, accessing the stored input in response to detecting the second system call, and determining whether to execute the second system call based on the stored input.

13. The method of claim 1, comprising displaying a message relating to the system call at the mobile device during execution of the software application.

14. The method of claim 13, comprising displaying, at the mobile device, an indicator representing a degree of maliciousness of the system call.

15. The method of claim 1, comprising, after a user-initiated launch of the software application and prior to the execution of the software application, changing a dynamic link such that during execution of the software application, a security and/or privacy monitoring routine executes prior to the execution of the system call.

16. The method of claim 1, comprising defining a runtime priority so that the non-operating system software routine has a higher runtime priority than the software application.

17. An electronic device comprising:
at least one processor,
at least one memory device coupled to the at least one processor, the at least one memory device having stored therein a plurality of instructions that when executed by the at least one processor, cause the at least one processor to:
process a first application package comprising a software application executable by a second electronic device to obtain at least one compiled component of the software application;
associate at least one security and/or privacy monitoring routine with the at least one compiled component of the software application without modifying or replacing the at least one compiled component of the software application, the at least one security and/or privacy monitoring routine comprising redirecting code configured to interface with the software application after a user-initiated launch of the software application and prior to the execution of the software application, the software application initiating a system call to the operating system during execution of the software application, the redirecting code enabling the detecting of the initiating of the system call by replacing an address associated with the system call with an address of intercepting code, the intercepting code configured to pass an argument of the system call to policy enforcing code, the policy enforcing code configured to, during execution of the software application by the second electronic device, determine whether the software application is attempting to perform a potentially unauthorized activity; and
create a second application package comprising the software application and the at least one security and/or privacy monitoring routine, the second application package adapted for installation by the second electronic device.

18. The electronic device of claim 17, configured to receive the first application package from the second electronic device via the network interface.

19. At least one non-transitory computer accessible medium comprising a plurality of instructions that in response to being executed, result in a mobile computing device:
in response to a request to download an application package comprising at least one executable software application to the mobile computing device:
initiating the creation of a new application package comprising the at least one executable software application and at least one security and/or privacy monitoring routine without modifying or replacing any of the executable components of the executable software application, the at least one security and/or privacy monitoring routine comprising redirecting code configured to interface with the software application after a user-initiated launch of the software application and prior to the execution of the software application, the software application initiating a system call to the operating system during execution of the software application, the redirecting code enabling the detecting of the initiating of the system call by replacing an address associated with the system call with an address of intercepting code, the intercepting code configured to pass an argument of the system call to policy enforcing code, the policy enforcing code configured to, during execution of the software application, determine whether the software application is attempting to perform a potentially unauthorized activity.

20. The at least one non-transitory computer accessible medium of claim 19, comprising initiating the installation of the new application package on the mobile computing device.

21. The at least one non-transitory computer accessible medium of claim 19, comprising initiating creation of the new application package at a second computing device communicatively coupled to the mobile computing device by a network and initiating downloading of the new application package to the mobile computing device.

22. A method for at least temporarily preventing an executable software application from executing a potentially unauthorized activity on a mobile computing device, the method comprising, at the mobile computing device:
receiving input from a user of the mobile computing device, the input relating to at least one security, privacy, and/or performance monitoring policy associated with the executable software application;
configuring computer code to monitor execution of the executable software application based on the policy, the computer code comprising redirecting code configured to interface with the software application after a user-initiated launch of the software application and prior to the execution of the software application, the software application initiating a system call to the operating system during execution of the software application, the redirecting code enabling the detecting of the initiating of the system call by replacing an address associated with the system call with an address of intercepting code, the intercepting code configured to pass an argument of the system call to policy enforcing code, the policy enforcing code configured to, during execution of the software application, determine whether the software application is attempting to perform a potentially unauthorized activity; and
repackaging the executable software application with the computer code, without modifying or replacing any of the executable components of the executable software application, so that the computer code is executed in response to execution of the executable software application by the mobile computing device.

23. The method of claim 22, comprising receiving the input from the user during execution of the repackaged software application by the mobile computing device, and configuring the computer code based on the input received during execution of the repackaged software application.

24. The method of claim 22, comprising repackaging the executable software application so that the computer code is executable in response to loading of the executable software application into memory for execution at the mobile computing device.

25. The method of claim 22, comprising repackaging the executable software application without modifying the mobile computing device's operating system.

26. The method of claim 25, comprising repackaging the executable software application without modifying the executable software application.

27. A computing device comprising:
at least one processor, and at least one memory device coupled to the at least one processor, the at least one memory device having stored therein a plurality of processor-executable instructions configured to:

receive a request to download an executable software application to a mobile computing device; and in response to the request and prior to executing the executable software application at the mobile computing device:

without modifying or replacing any of the executable components of the executable software application, repackage the executable software application with computer code configured to monitor at least one of security, privacy, and performance of the executable software application, so that the computer code is executable in response to execution of the executable software application at the mobile computing device, wherein the computer code comprises redirecting code configured to interface with the software application after a user-initiated launch of the software application and prior to the execution of the software application, the software application initiating a system call to the operating system during execution of the software application, the redirecting code enabling the detecting of the initiating of the system call by replacing an address associated with the system call with an address of intercepting code, the intercepting code configured to pass an argument of the system call to policy enforcing code, the policy enforcing code configured to, during execution of the software application, determine whether the software application is attempting to perform a potentially unauthorized activity.

28. The computing device of claim 27, wherein the computer code is configured to detect activity of the executable software application that conflicts with at least one user-specified security, privacy, and/or performance monitoring policy of the mobile computing device.

29. The computing device of claim 28, wherein the computer code is configured to detect activity that may be initiated by the executable software application without the user's knowledge.

30. The computing device of claim 27, configured to receive input from a user of the mobile computing device during execution of the repackaged software application and configure the computer code based on the input received during execution of the repackaged software application.

31. The computing device of claim 27, configured to initiate repackaging of the executable software application prior to downloading the executable software application to the mobile computing device.

* * * * *